(12) United States Patent
Zucker et al.

(10) Patent No.: US 10,891,480 B2
(45) Date of Patent: Jan. 12, 2021

(54) IMAGE ZONE PROCESSING

(71) Applicant: NCR Corporation, Atlanta, GA (US)

(72) Inventors: Brent Vance Zucker, Roswell, GA (US); Adam Justin Lieberman, Suwanee, GA (US); Qian Yang, Smyrna, GA (US)

(73) Assignee: NCR Corporation, Atlanta, GA (US)

( * ) Notice: Subject to any disclaimer, the term of this patent is extended or adjusted under 35 U.S.C. 154(b) by 128 days.

(21) Appl. No.: 16/144,482

(22) Filed: Sep. 27, 2018

(65) Prior Publication Data

US 2020/0104591 A1 Apr. 2, 2020

(51) Int. Cl.
*G06K 9/00* (2006.01)
*G06F 16/903* (2019.01)

(52) U.S. Cl.
CPC ....... *G06K 9/00624* (2013.01); *G06F 16/903* (2019.01); *G06K 9/00201* (2013.01); *G06K 9/00335* (2013.01)

(58) Field of Classification Search
CPC .... G06F 16/56; G06F 16/583; G06F 3/04842; G06N 5/046
USPC ....... 382/100, 103, 107, 115, 106, 155, 156, 382/162, 168, 172, 181, 190, 216, 224, 382/232, 276, 305; 375/240.01; 348/143, 169; 340/500
See application file for complete search history.

(56) References Cited

U.S. PATENT DOCUMENTS

| | | | |
|---|---|---|---|
| 7,515,738 B1* | 4/2009 | Moritz | G07C 9/37 382/115 |
| 7,734,066 B2* | 6/2010 | DeLia | G06Q 10/02 378/57 |
| 8,131,011 B2* | 3/2012 | Nevatia | G06K 9/00369 382/103 |
| 9,576,371 B2* | 2/2017 | Mongeon | G06K 9/00778 |
| 10,217,226 B2* | 2/2019 | Maranatha | G06K 9/00771 |
| 10,325,370 B1* | 6/2019 | Jabari | G06T 7/003 |
| 10,515,114 B2* | 12/2019 | Petrou | G06K 9/00288 |
| 2003/0047387 A1* | 3/2003 | Bogat | A47F 9/047 186/59 |
| 2004/0240542 A1* | 12/2004 | Yeredor | G06K 9/00771 375/240.01 |
| 2008/0228039 A1* | 9/2008 | Huseth | G08B 21/0423 600/300 |
| 2011/0002548 A1* | 1/2011 | Sivakumar | G08B 13/19682 382/199 |

OTHER PUBLICATIONS

Wojke, Nicolai, et al., "Simple Online and Realtime Tracking with a Deep Association Metric", 2017 IEEE International Conference on Image Processing (ICIP), (Sep. 2017), 5 pages.

* cited by examiner

*Primary Examiner* — Sheela C Chawan

(74) *Attorney, Agent, or Firm* — Schwegman, Lundberg & Woessner

(57) ABSTRACT

Cameras capture time-stamped images of predefined areas. The predefined areas are assigned to one or more zones. The images are processed to recognize items and persons within the zones. Custom metrics with respect to each zone relative to at least time durations, items, and persons are logged in a data store. An interface is provided to custom define queries that are processed against the data store. In an embodiment, the data store is mined to discover relationships between the metrics for each zone, and real-time actions are processed when predefined conditions are discovered from the metrics.

12 Claims, 4 Drawing Sheets

US 10,891,480 B2

IMAGE ZONE PROCESSING

BACKGROUND

Cameras or video cameras are pervasively situated in businesses and in homes of consumers. Primarily, the cameras provide a mechanism by which businesses or consumers can track (sometimes in real time) what is happening within a defined space that the camera is configured to capture images of.

However, there is little to no real image processing provided in the industry with respect to these captured images; rather the images are simply stored for reference if needed by the businesses or the consumers.

The businesses and the consumers are primarily using the stored images/video as a reference tool for manual investigation should a security concern arise. Often, the stored images/video are only referenced after the security concern arose and as a mechanism to identify individuals that created the security concern. In fact, there is little proactive real-time security concern avoidance processing available in the industry with respect to these captured images. Furthermore, very little useful information is provided with the images stored.

SUMMARY

In various embodiments, methods and a system for image zone processing over time are presented.

According to an embodiment, a method for image zone processing is presented. Images from cameras captured of different areas of an enterprise are obtained. Area identifiers representing the different areas are mapped to zones. Metrics are identified based on custom conditions detected in the images for each zone. The metrics are logged in a data store, and an interface is provided for defining custom queries to process against the metrics in the data store.

DETAILED DESCRIPTION

Figure 1:
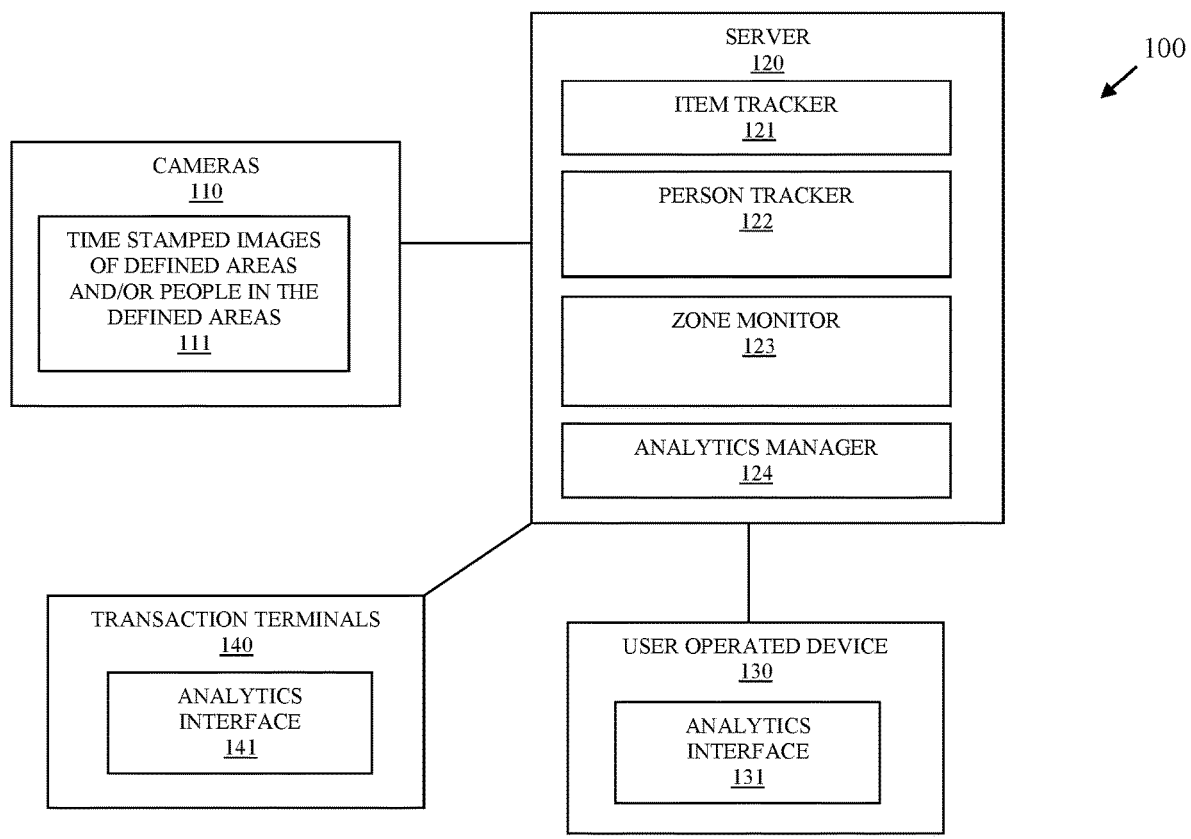
FIG. 1 is a diagram of a system image zone processing, according to an example embodiment.

FIG. 1 is a diagram of a system 100 for image zone processing, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of image zone processing, presented herein and below.

As used herein and below, the terms "customer," "consumer," and "user" may be used interchangeably and synonymously.

The system 100 includes a plurality of cameras 110 that capture time-stamped images of defined areas and/or people in the defined areas (herein after just "defined area images 111"). The system 100 may include a user-operated device 130 and one or more transaction terminals 140. The server 120 includes executable instructions that execute on one or more hardware processors of the server 120 from a non-transitory computer-readable storage medium as: an item tracker 121, a person tracker 122, a zone monitor 123, and an analytics manager 124.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 being capturing the time-stamped images 111 in frames. In an embodiment, the cameras 110 capture images at a rate of 20 to 30 frames per second.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store but can be other enterprises or even a consumer's home). Each camera lens configured to cover one or more predefined areas of the physical space of the enterprise. In an embodiment, each camera lens is assigned a primary area and one or more secondary areas that the lens captures in the images 111.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, the zone monitor 123, and the analytics manager 124. In an embodiment, some of the images when streamed from the cameras 110 can be buffered or cached in memory of cache and made accessible from the memory or cache to the item tracker 121, the person tracker 122, the zone monitor 123, and the analytics manager 124.

Each accessible image 111 includes its metadata (minimally including what was discussed above) with its image 111 on the server 120.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

In a similar manner, the item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc.

The zone monitor 123 is configured to interact with the item tracker 121 and the person tracker 122 to receive metadata provided by the item tracker 121 and the person tracker 122 for each image that includes unique identifiers for any known or unknown person and for any known or unknown item. Each such image provided by the item tracker 121 and the person tracker 122 also includes the original camera's metadata (camera identifier, camera location, camera lens coverage areas, etc.).

Each camera's area identifier is assigned to a zone of interest that the enterprise is interested in obtaining analytics on. Multiple area identifiers can belong to a single predefined zone or a single area identifier can belong to a single predefined zone. A mapping is maintained on the server 120 that includes the mappings between the area identifiers and each predefined zone.

The zone monitor 123 can be configured through the analytics manager 124 using a user-facing interface for a user (personnel of the store) to define the zones, change the zones, and/or add new predefined zones. The analytics manager 124 also includes an Application Programming Interface (API) to instruct the zone monitor 123 to update the mappings for the zones.

The user facing interface of the analytics manager 124 and the API between the analytics manager 124 and the zone monitor 123 can also permit the user to custom define the metrics or conditions that the zone monitor 123 is to monitor for each of the zones.

The custom-defined conditions can include a variety of conditions, such as, but not limited to: duration of any person appearing within a given zone, repetitive visits of a person to a given zone after having left the given zone and returning to the given zone, a person's given position and/or orientation within a given zone, a total number of persons appearing within a given zone for a given period of time, persons appearing in a zone identified as secure that are unauthorized to be in that zone, a state of a zone (total number of items in the zone, structures in the zone, people in the zone, etc.), items possessed by a person or persons in a zone, specific zones that an unknown person or a known person visited within a single visit to the store or within a set of custom defined trips of the person to the store, any of the above-mentioned conditions based a total number of persons, a specific set of known persons, and/or a single known or unknown person.

The zone monitor 123 receives processed images from the item tracker 121 and the person tracker 122 with the bounding boxes for each such item and person and the original camera metadata. The zone monitor 123 maps the cameras' area identifiers to the predefined zones using the mapping and identifies when a person or item is in any given zone when those item and person bounding boxes intersect with that zone's location. The zone monitor 123 then logs information to a database or data store, such information can include time stamps, frame numbers, camera identifiers, zone identifier, item identifier (provided by the item tracker 121), person identifier (provided by the person tracker 122), and links to the raw stored images that correspond to the images 111 for which the information was logged.

The zone monitor 123 can be configured to perform queries issued from the analytics manager 124 against the logged information and/or can be configured to performing mining of the logged information on behalf of the analytics manager 124 to discover patterns in the logged information. A pattern is a set of conditions that repeat within the logged information, for example, zone 1 had at least 5 persons in that zone within a given time period that stayed for at least 10 minutes. The API between the analytics manager 124 and the zone monitor 123 can permit the analytics manager 124 to define the conditions or desired patterns for the zone monitor 123 to process against the logged information. Some of these conditions can be dynamically queries provided by users through the user-facing interface of the analytics manager 124. Some of these conditions can be predefined queries that the zone monitor 123 is to process on specific days of the week, days of the month, etc.

So, the zone monitor 123 can process queries or requests provided through the analytics manager 124 against the logged information (dynamically defined or at predefined intervals) and/or can be instructed by the analytics manager 124 to perform mining of the logged information to discover new and previously unknown patterns/relationships from the logged information.

The zone monitor 123 can also be configured through the API of the analytics manager 124 to perform real time processing actions based on predefined conditions detected by the zone monitor 123 within a given zone. For example, the conditions can define that when any person is in possession of any item in zone 1, the zone monitor 123 is to send a real time alarm instruction to a sound and/or light, send a text message to predefined personnel along with a link to the images that correspond to the conditions. So, real time processing actions that the zone monitor 123 is to take with a given set of conditions can be custom configured through the API of the analytics manager 124. The given set of conditions can be provided to the analytics manager 124 by a user through the user-facing interface of the analytics manager 124. As another example, consider a set of custom conditions defined for the zone monitor 123 that indicate if any store personnel besides the store manager is in secure zone of the store (perhaps where the store safe is located), the zone monitor 123 is to send a real time text message to the store manager identifying the breach and the specific store personnel detected in that secure zone.

In an embodiment, the zone monitor 123 can be customer configured with conditions to serve as a security system for the store when the zone monitor has been placed in a security system mode of operation. Such real time actions can include calling authorities, notifying the manager, calling the fire department when a sensor indicates a fire, etc.

The logged information coupled with the zone monitor 123 and the analytics manager 124 also permits a unique opportunity for stores to obtain intelligent information regarding the usage of their physical space. The stores can identify situations with customers interacting with their space to discover when product placement should be adjusted, identify when advertisements appear effective and ineffective, identify when the space needs to increased or decreased for more efficient use of that space, identify a space where store personnel is needed for customer assistance, identify products or advertisements that appear to be trending as being popular or unpopular with customers, etc.

In fact, a myriad of intelligence can be custom derived and discovered through the system 100 by creating and storing the logged information and providing the derived intelligence through the analytics manager 124 and the zone monitor 123 by mining the logged information for discovery of new relationships detected in the zones and by processing user-defined queries for reporting.

In an embodiment, the item tracker 121 and the person tracker 122 may provide frames of the images 111 for which the item and the person are presently unknown to the item tracker 121 and the person tracker 122. However, because of the frame numbers, time stamps, and unique unknown item tracking identifiers, and unique unknown person identifiers, once the item tracker 121 and the person tracker 122 are able to identify the item and person, the zone monitor can link in the logged information the unknown item tracking identifier to the now known item identifier and link the unknown person identifier to a specific person identifier. This does not require modifying the already logged information and only requires associating the known identifiers with the previously unknown tracking identifiers, which can be done with a mapping table. The mapping table can also be accessed through the interaction of the user-facing interface of the analytics manager 124 and the API between the analytics manager 124 and the zone monitor 123, such that manually discovered or determined specific items and persons can be easily linked and associated with their previously unknown item and person tracking identifiers.

In an embodiment, the zone monitor 123 can be configured to monitor the background or still and static images of each zone and capture additional metadata to store with the logged information of the database, such as number of each time of item, advertisement placement, product layout, equipment in the zone, lighting in the zone, etc. This detail about the background or still portion of the zone can overlay the dynamic information captured for each zone to provide further analytics or mining opportunities for the store. For example, one zone may experience more traffic than a similar different zone and the logged information may reveal that the lighting provided in the more frequented zone is different from that which is provided in other less frequented zone. That is, the ascetics and layout or environment state of the zones can be compared and analyzed vis-à-vis one another.

In an embodiment, real time actions taken by the zone monitor 123 can include sending notifications and/or alerts to user-operated devices 130 through an analytics interface 131 and/or transaction terminals 140 through an analytics interface 141. The interfaces 131 and 141 also interact with the user-facing interface of the analytics manager 124 such that an operator of either the transaction terminal 140 or the user operated device 131 can, with proper security authorization, custom submit queries to the zone monitor 123 through the analytics manager 124 or custom configure the zone monitor 123 as was discussed above.

In an embodiment, the transaction terminals 140 include one or more of: a Point-Of-Sale (POS) terminal and a Self-Service Terminal (SST).

In an embodiment, the user-operated device 130 includes one or more of: a phone, a tablet, a laptop, a desktop computer, a different server, a wearable processing device, and/or a device that is part of the Internet-of-Things (IoTs—such as a network-voice enabled device).

These and other embodiments of the system 100 are now discussed with reference to the FIGS. 2-4.

Figure 2:
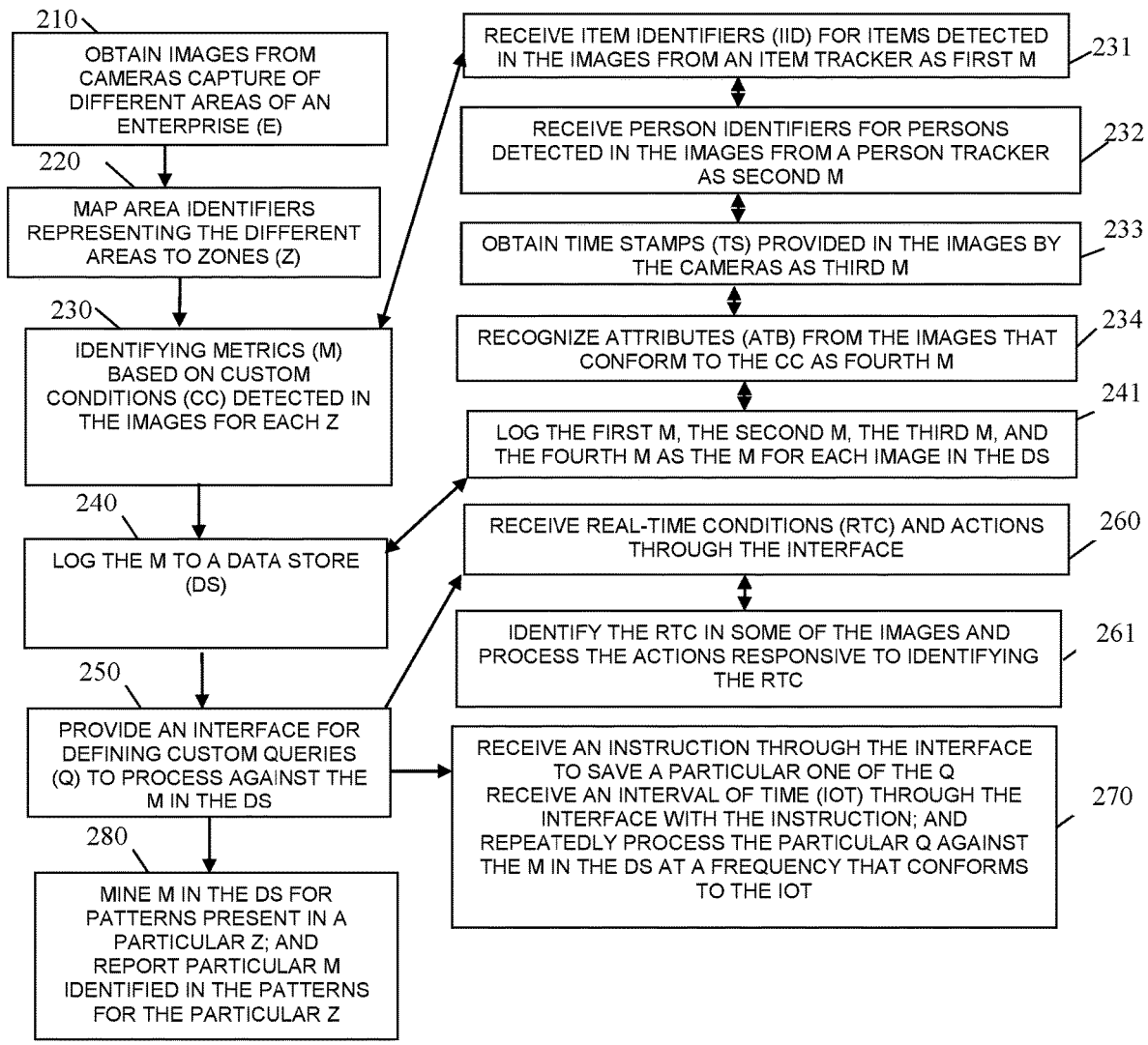
FIG. 2 is a diagram of a method for image zone processing, according to an example embodiment.

FIG. 2 is a diagram of a method 200 for image zone processing, according to an example embodiment. The software module(s) that implements the method 200 is referred to as a "zone monitor." The zone monitor is implemented as executable instructions programmed and residing within memory and/or a non-transitory computer-readable (processor-readable) storage medium and executed by one or more processors of a device. The processor(s) of the device that executes the zone monitor are specifically configured and programmed to process the zone monitor. The zone monitor has access to one or more network connections during its processing. The network connections can be wired, wireless, or a combination of wired and wireless.

In an embodiment, the device that executes the zone monitor is the server 120. In an embodiment, the server 120 is a cloud-based server.

In an embodiment, the zone monitor is all or some combination of: the item tracker 121, the person tracker 122, the zone monitor 123, and/or the analytics manager 124.

At 210, the zone monitor obtain images from cameras captured of different areas of an enterprise. The cameras are configured to capture physical areas of the enterprise, each camera having a different field-of-view of the physical areas. In an embodiment, at least some cameras overlap in their fields-of-view for the same physical area. The areas are associated with zones.

At 220, the zone monitor maps the area identifiers representing different areas to zones. That is, each camera and each area covered by that camera is assigned to a zone. Again, a single zone can be associated with more than 1 camera, and multiple overlapping areas can be associated with a same zone. In an embodiment, the area identifiers are mapped to the specific zone identifiers for the zones in a mapping table.

At 230, the zone monitor identifies metrics based on custom conditions detected in the images for each zone. That is, the zone monitor processes the images for detecting visual representations in the images that comport with the custom conditions.

In an embodiment, at 231, the zone monitor receives item identifiers for items detected as being represented in the images from an item tracker as first metrics that comport with the custom conditions. In an embodiment, the item tracker is the item tracker 121.

In an embodiment, at 232, the zone monitor receives person identifiers for persons detected as being represented in the images from a person tracker as second metrics that comport with the custom conditions. In an embodiment, the person tracker is the person tracker 122.

In an embodiment, at 233, the zone monitor obtains time stamps provided in the images by the cameras with each image as third metrics that comport with the custom conditions.

In an embodiment, at 234, the zone monitor recognizes attributes from the images that conform to the custom conditions a fourth metrics that comport with the custom conditions. Here, specific background equipment, environmental lighting, structures of the zones are defined by some of the custom conditions processed by the zone monitor to detect if present in the images.

At 240, the zone monitor logs the metrics to a data store or a relational database.

In an embodiment of 234 and 240, at 241, the zone monitor logs the first metrics, the second metrics, the third metrics, and the fourth metrics as the metrics.

At 250, the zone monitor provides an interface for defining custom queries to process against the metrics in the data store. In an embodiment, the interface is provided by the analytics manager 124 to transaction terminals 140 and user-operated devices 130 through device-based interfaces 141 and 131. The queries can be item specific, person specific, zone specific, and time based.

According to an embodiment, at 260, the zone monitor receives real-time conditions and actions to process with the real-time conditions through the interface.

In an embodiment of 260, at 261, the zone monitor identifies the real-time conditions in some of the images and processes the actions responsive to identifying the real-time conditions and being represented in the images.

In an embodiment, at 270, the zone monitor receives an instruction through the interface to save a particular one of the queries. The zone monitor also receives an interval of time through the interface with the instruction. The zone monitor repeatedly processes the particular query against the metrics in the data store at a frequency that conforms to the interval of time.

In an embodiment, at 280, the zone monitor mines the data store for patterns present in a particular zone and reports the particular metrics identified in the patterns for the particular zone through the interface. The zone monitor may also report the patterns discovered through the interface as potential relationships discovered through the mining of the metrics.

Figure 3:
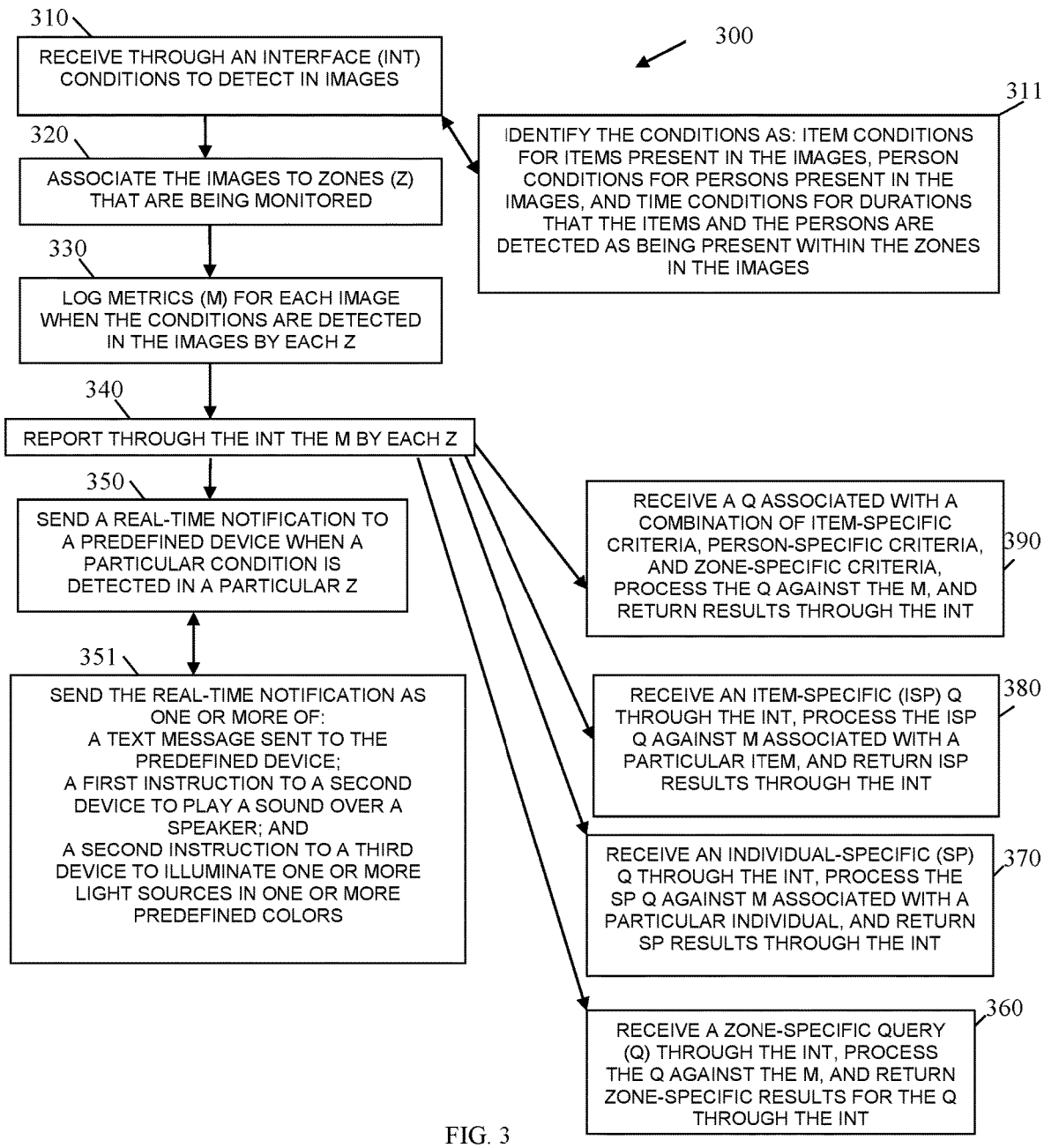
FIG. 3 is a diagram of another method for image zone processing, according to an example embodiment.

FIG. 3 is a diagram of another method 300 for image zone processing, according to an example embodiment. The software module(s) that implements the method 300 is referred to as a "zone manager." The zone manager is implemented as executable instructions programmed and residing within memory and/or a non-transitory computer-readable (processor-readable) storage medium and executed by one or more processors of a device. The processors that execute the zone manager are specifically configured and programmed to process the zone manager. The zone manager has access to one or more network connections during its processing. The network connections can be wired, wireless, or a combination of wired and wireless.

In an embodiment, the device that executes the zone manager is the server 120. In an embodiment, the server 120 is a cloud processing environment.

In an embodiment, the zone manager is all of or some combination of: the item tracker 121, the person tracker 122, the zone manager 123, the analytics manager 124, and/or the method 200.

The zone manager presents another and in some ways enhanced processing perspective of the method 200 discussed above.

At 310, the zone manager receives through an interface conditions to detect as being represented in images captured by cameras of an enterprise. In an embodiment, the interface is provided to a user through the user-facing interface of the analytics manager 124 and the transaction terminal interface 141 and the user-operated device interface 131, as was discussed above with the description of the FIG. 1.

In an embodiment, at 311, the zone manager identifies the conditions as item conditions present in the images, person conditions for persons present in the images, and time conditions for durations that the items and the persons are detected within the zones in the images.

At 320, the zone manager associates the images to zones that are being monitored within the enterprise. This can be done through a mapping table that maps a particular cameras area of coverage for physical locations within the enterprise to predefined zone identifiers for the zones. This was also discussed at length above with the discussion of the FIGS. 1-2.

At 330, the zone manager logs metrics for each image when the conditions are detected in the images by each of the zones.

At 340, the zone manager selectively reports, through the interface, the metrics by each zone or by custom-defined collections of the zones.

In an embodiment, at 350, the zone manager sends a real-time notification to a predefined device when a particular condition is detected in a particular zone.

In an embodiment of 350 at 351, the zone manager sends the real-time notification as one or more of: a text message sent to the predefined device, a first instruction to a second device to play a sound over a speaker, and a second instruction to a third device to illuminate one or more light sources in one or more predefined colors.

In an embodiment, at 360, the zone manager receives a zone-specific query through the interface, processes the zone-specific query against metrics associated with a particular zone, and returns zone-specific results for the zone-specific query through the interface.

In an embodiment, at 370, the zone manager receives an individual-specific query through the interface, processes the individual-specific query against metrics associated with a particular individual, and returns individual-specific results through the interface.

In an embodiment, at 380, the zone manager receives an item-specific query through the interface, processes the item-specific query against metrics associated with a particular item, and returns item-specific results through the interface.

In an embodiment, at 390, the zone manager receives a query associated with a combination of item-specific criteria, person-specific criteria, and zone-specific criteria. The zone manager processes the combination query against the metrics and returns results through the interface.

Figure 4:
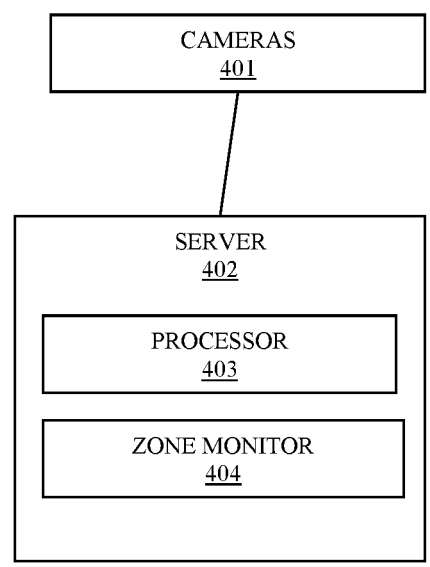
FIG. 4 is a diagram of a system for image zone processing, according to an example embodiment.

FIG. 4 is a diagram of a system 400 for image zone processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

In an embodiment, system 400 is the cameras 110 and the server 120.

The system 400 includes a plurality of cameras 401 and a server 402. The server 402 includes at least one hardware processor 403 and configured to execute executable instructions from a non-transitory computer-readable storage medium as a zone monitor 404.

The zone monitor 404 when executed from the non-transitory computer-readable storage medium on the processor 403 is configured to: 1) classify images received from cameras into zones; 2) process the images to detect items and persons represented in the images within the zones; 3) log metrics for the images to a data store; and 4) provide an interface to execute queries against the metrics from the data store that are at least specific to: the items, the persons, and the zones.

In an embodiment, the zone monitor 404 is further configured to process real-time actions in response to detecting predefined conditions within the zones from the images.

In an embodiment, the zone monitor 404 is all of or some combination of: the item tracker 121, the person tracker 122, the zone monitor 123, the analytics manager 124, the method 200, and the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining images from cameras captured of different areas of an enterprise;
   mapping area identifiers representing the different areas to zones;
   identifying metrics based on custom conditions detected in the images for each zone;
   logging the metrics in a data store;
   providing an interface for defining custom queries to process against the metrics in the data store;
   receiving an instruction through the interface to save a particular one of the queries as a first query;
   receiving an interval of time through the interface with the instruction; and
   repeatedly processing the first query against the metrics in the data store at a frequency that conforms to the interval of time.

2. The method of claim 1, wherein identifying further includes receiving item identifiers for items detected in the images from an item tracker as first metrics.

3. The method of claim 2, wherein identifying further includes receiving person identifiers for persons detected in the images from a person tracker as second metrics.

4. The method of claim 3, wherein identifying further includes obtaining time stamps provided in the images by the cameras as third metrics.

5. The method of claim 4, wherein identifying further includes recognizing attributes from the images that conform to the custom conditions as fourth metrics.

6. The method of claim 1, wherein logging further includes logging the first metrics, the second metrics, the third metrics, and the fourth metrics as the metrics for each image in the data store.

7. The method of claim 1 further comprising, receiving real-time conditions and actions through the interface.

8. The method of claim 7, wherein receiving further includes identifying the real-time conditions in some of the images and processing the actions responsive to identifying the real-time conditions.

9. The method of claim 1 further comprising:
   mining the metrics in the data store for patterns present in a particular zone; and
   reporting particular metrics identified in the patterns for the particular zone.

10. A method, comprising:
    receiving through an interface conditions to detect in images;
    associating the images to zones that are being monitored;
    logging metrics for each image when the conditions are detected in the images by each zone;
    reporting through the interface the metrics by each zone; and
    sending a real-time notification to a predefined device when a particular condition is detected in a particular zone, wherein sending further includes sending the real-time notification as one or more of: a text message sent to the predefined device, a first instruction to a second device to play a sound over a speaker, and, a second instruction to a third device to illuminate one or more light sources in one or more predefined colors.

11. A method further comprising:
    receiving through an interface conditions to detect in images;
    associating the images to zones that are being monitored;
    logging metrics for each image when the conditions are detected in the images by each zone;
    reporting through the interface the metrics by each zone; and
    processing one of:

(1) receiving a zone-specific query through the interface, processing the zone-specific query against the metrics that are associated with a particular zone identified by the zone-specific query, and returning zone-specific results through the interface;
(2) receiving an individual-specific query through the interface, processing the individual specific query against the metrics that are associated with a particular individual, and returning individual-specific results through the interface;
(3) receiving an item-specific query through the interface, processing the item-specific query against the metrics that are associated with a particular item, and returning item-specific results through the interface; and
(4) receiving a query associated with a combination of item-specific criteria, person-specific criteria, and zone-specific criteria, processing the query against the metrics that are associated with given items defined by the item-specific criteria, given individuals defined by the person-specific criteria, and given zones defined by the zone-specific criteria, and returning results through the interface.

12. The method of claim 11, wherein receiving the conditions further includes identifying the conditions as: item conditions for the given items present in the images, person conditions for the given individuals present in the images, and time conditions for durations of the given items and the given individuals being detected within the given zones in the images.

* * * * *